United States Patent [19]

Koizumi et al.

[11] Patent Number: 4,600,949
[45] Date of Patent: Jul. 15, 1986

[54] VIDEO CAMERA

[75] Inventors: Yukinori Koizumi; Toshimitsu Harada, both of Hachioji, Japan

[73] Assignee: Konishiroku Photo Industry Co., Ltd., Tokyo, Japan

[21] Appl. No.: 535,394

[22] Filed: Sep. 23, 1983

[30] Foreign Application Priority Data

Sep. 25, 1982 [JP]   Japan ................. 57-167337

[51] Int. Cl.$^4$ ............................................. H04N 5/26
[52] U.S. Cl. ........................... 358/229; 358/217
[58] Field of Search .............. 358/217, 224, 229, 213, 358/225; 250/239; 350/170, 173

[56] References Cited

U.S. PATENT DOCUMENTS

| | | | |
|---|---|---|---|
| 3,845,238 | 10/1974 | Schneider | 358/229 |
| 4,161,756 | 7/1979 | Thomas | 358/225 |
| 4,237,480 | 12/1980 | Franken | 358/229 |
| 4,344,092 | 8/1982 | Miller | 358/229 |
| 4,485,407 | 11/1984 | Böhm | 358/229 |
| 4,494,147 | 1/1985 | Komine | 358/229 |
| 4,499,504 | 2/1985 | Edakubo | 358/209 |

FOREIGN PATENT DOCUMENTS

| | | | |
|---|---|---|---|
| 2547561 | 9/1976 | Fed. Rep. of Germany | 358/229 |
| 673820 | 6/1952 | United Kingdom | 358/229 |

Primary Examiner—Gene Z. Rubinson
Assistant Examiner—L. C. Schroeder
Attorney, Agent, or Firm—Jordan B. Bierman

[57] ABSTRACT

A video camera comprising an image-forming lens system having an optical axis and a light-beam splitting means capable of splitting an incident light-beam from the image-forming lens system into a primary optical path along the optical axis and leading into a view finder means, and a secondary optical path bent at an angle to the primary optical path and leading into an electrical image-receiving means. There is provided a camera tube in the bent optical path and a view finder in the straight optical path. An electrical circuit means comprising printed circuit boards is arranged in a U-shape manner to cover three sides of the light-beam splitting means other than the side facing the secondary optical path.

11 Claims, 5 Drawing Figures

VIDEO CAMERA

BACKGROUND OF THE INVENTION

This invention relates to a video camera, and more particularly to a portable and miniaturized video camera improved on the components and structure thereof.

In recent years, small-sized video cameras have been developed and popularized. Similar to the case of 8 mm movie cameras which have been used with the same purpose as that of video cameras prior to the introduction of video cameras, the small-sized video cameras are also required to be readily portable and operable. With such a large-sized video camera as used in TV stations and the like, pictures are taken with viewing an image on the camera tube through the electron-viewfinder. It is, however, not easy to miniaturize such a large-sized video camera with a built-in electron viewfinder. In addition, when a camera tube is used to the picture taking device of a video camera, various electrical circuits including a high voltage circuit have been indispensable. Even if they are connected to a power source separated from the video camera body or a video recorder through a connector cord, some circuits are still necessary to be equipped to the video camera in itself. Thus although, several kinds of small-sized video cameras have already been introduced, nonetheless satisfactrily compact and miniturized video camera has still been a long-felt want.

OBJECT AND SUMMARY OF THE INVENTION

It is an object of the invention to provide a video camera having a specific structural arrangement, whereby miniaturization thereof by approximately 30 to 50% in terms of volume becomes possible.

Thus the invention specifically relates to a video camera which comprises (1) an optical image-forming system, (2) an electrical image receiving means and (3) an electrical circuit for operating video recording, wherein at least a part of said electrical circuit is provided on a circuit board and said circuit board is so arranged to cover at least three circumferential sides said optical system. In accordance with one of the typical embodiment of the invention, the video camera is constructed as follows; an optical path of a zoom-lens is branched into two and on one of the separated optical path there is provided a camera tube by bending incident light orthogonally and a viewfinder to the other being straight-forward; print-circuit boards so as to cover U-shapewise the branched portion; electric devices such as a glass-delay and the like to the circumferences of the paths of the branched portion and the camera tube; a high voltage circuit board adjacent to the camera tube; and the camera tube and the high voltage circuit board built-in to a grip.

DESCRIPTION OF THE PREFERRED EMBODIMENTS

Figure 1:
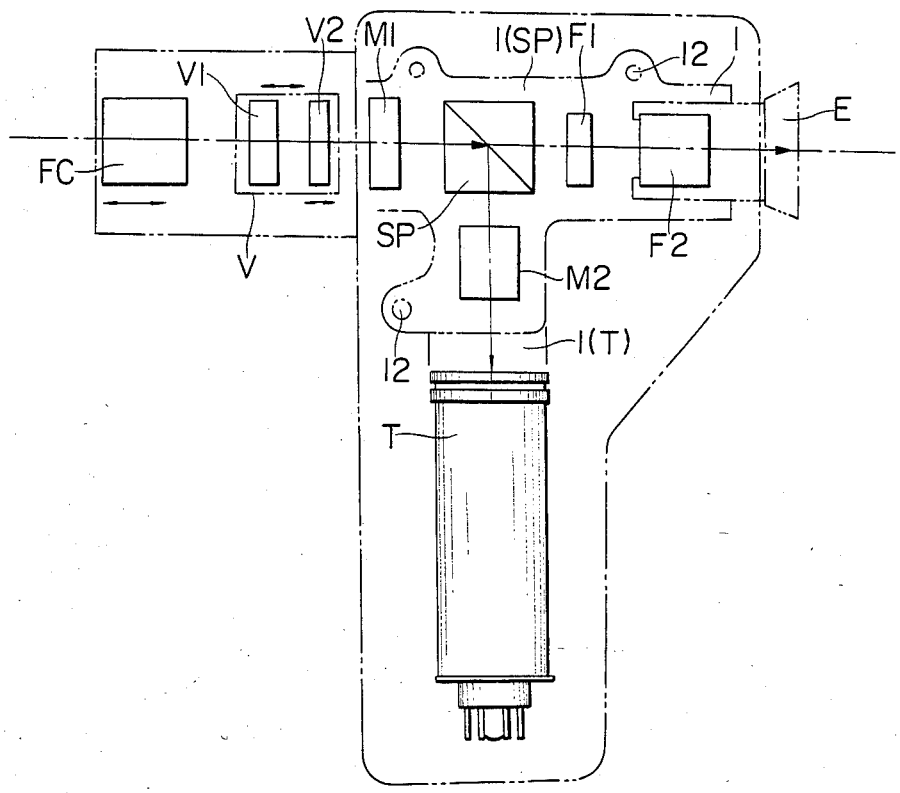
FIG. 1 shows the optical system arrangements and an example structure of the video camera of the invention.

FIG. 1 illustrates an example of the optical system of a video camera of the invention. Whereto, there provide a focusing lens group FC which moves back and forth to bring a subject into focus and a variable magnification lens group movable back and forth which comprises a front lens group $V_1$ and a rear lens group $V_2$ equipped next to the focusing lens group FC. Next thereto, there are a front lens group $M_1$ for bringing subject image into focus and a light-beam splitting prism SP or a half-mirror splitting an optical path into an image taking optical path and a viewfinder optical path. By means of the beam splitting prism SP having a semitransparent mirror provided at the angle of 45° to the optical path, a part of the optical path is bent orthogonally so as to constitute an optical picture taking system which brings a subject image into focus on the picture surface of a camera tube T through the rear lens group $M_2$ for focusing.

On the other hand, another part of the optical path constitutes an optical viewfinder system comprising a front viewfinder group $F_1$ and a rear viewfinder group $F_2$ both of which can serve as a viewfinder when the eye is in an eye-piece position. It is required that these optical systems should be in alignment with the optical path, and every lens position should relatively be arranged, and in addition they are all integrated into the lens barrel member 1.

In a video camera having such optical systems as mentioned above, electric power is usually supplied from the outside of the camera casing through connector cord 2 and a picture taking signal is obtained through an electrical image receiving means such as camera tube T and the respective circuits for orientation, high voltage, signal generation and signal processing, and the picture taking signal is then sent again to a video recorder from the connector cord 2 to serve as an external output.

In this example, these circuits each are constituted on a plurality of printed circuit boards so that they cover three sides of the lens barrel member 1.

In other word, these boards are disposed arround the lens barrel member to form a U-shapewise when viewed from the front side of the optical path.

Figure 3:
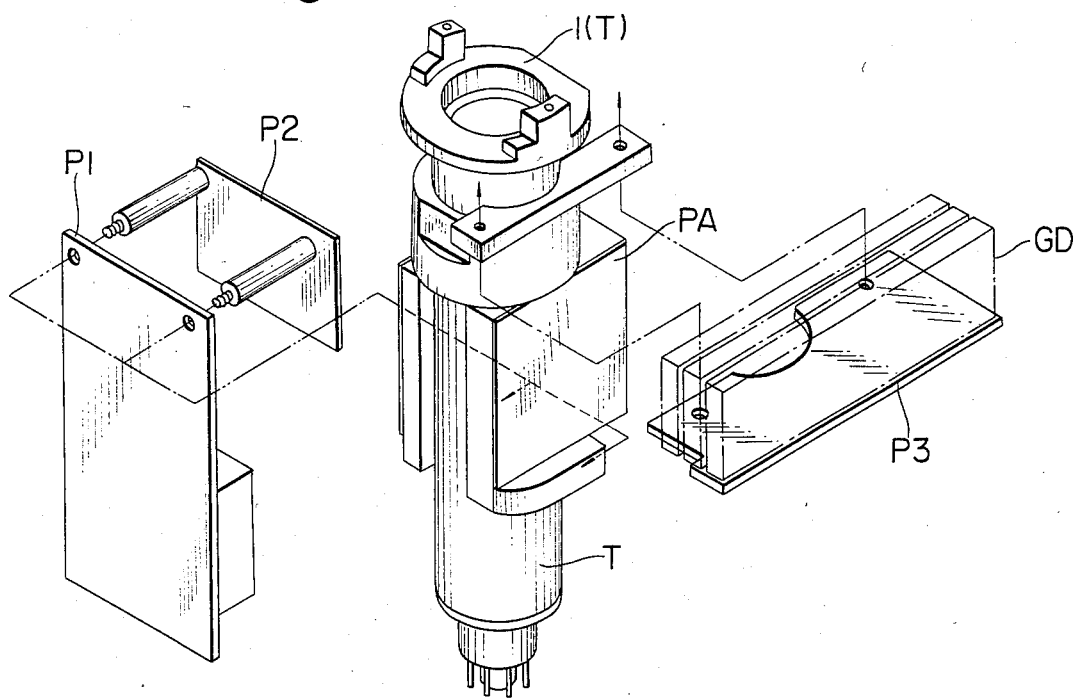
Figure 2:
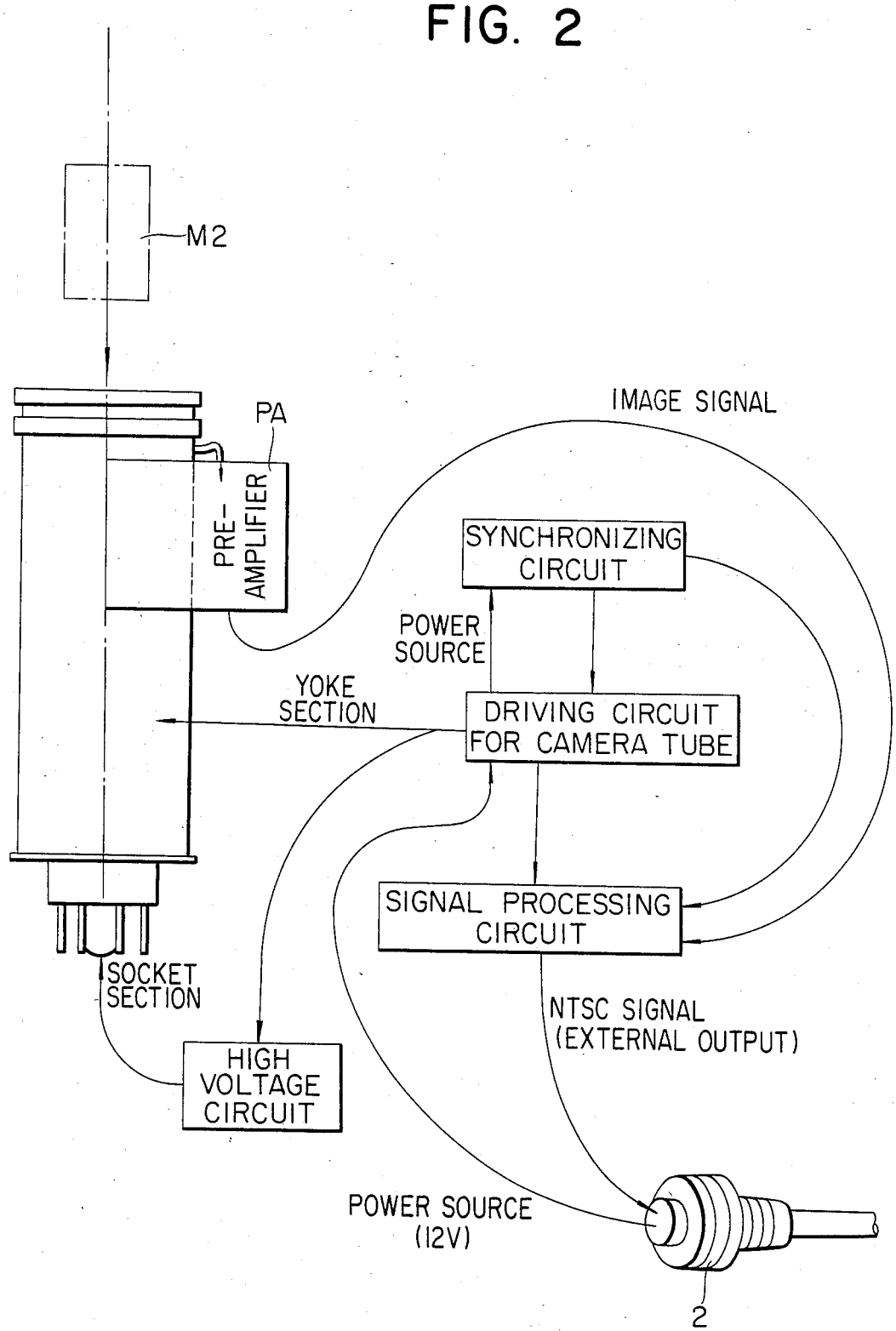
FIG. 2 shows a typical example of electric circuit arrangement of a video camera according to the invention, FIG. 3 and FIG. 4 respectively illustrate schematic view of how the electrical circuit board is to be arranged around the lens barrel.

Video camera illustrated in FIG. 1 has a built-in camera tube T inside the grip of the camera and the camera tube T is attached to a lens barrel member 1 through a camera tube fixture frame 1 (T). FIG. 3 illustrates the interrelation between the neighborhood of the camera tube T and the electrical circuit board to be fitted to the space between a splitting prism SP and the camera tube T. Printed circuit board P1 is for a high voltage circuit use to form thereon a high voltage circuit and is to be fitted to the camera tube fixture frame 1 (T). Provision of the high voltage circuit close to the camera tube T will facilitate elimination of extra high voltage wiring. Thus camera tube T and printed circuit board P1 for high voltage circuit are preferably built in the grip of the camera. A deflection circuit is formed on a printed circuit board P2. A signal given from the camera tube T is received by a signal processing circuit through a preamplifier PA provided so as to come into close contact with the camera tube T.

In the signal processing circuit, there is provided, for example, a glass delay GD which is a relatively larger part in size. The relatively larger parts including the glass delay GD are fitted onto a printed circuit board P3 which is provided to the outer circumference of the optical path from splitting prism SP to camera tube T.

Figure 4:
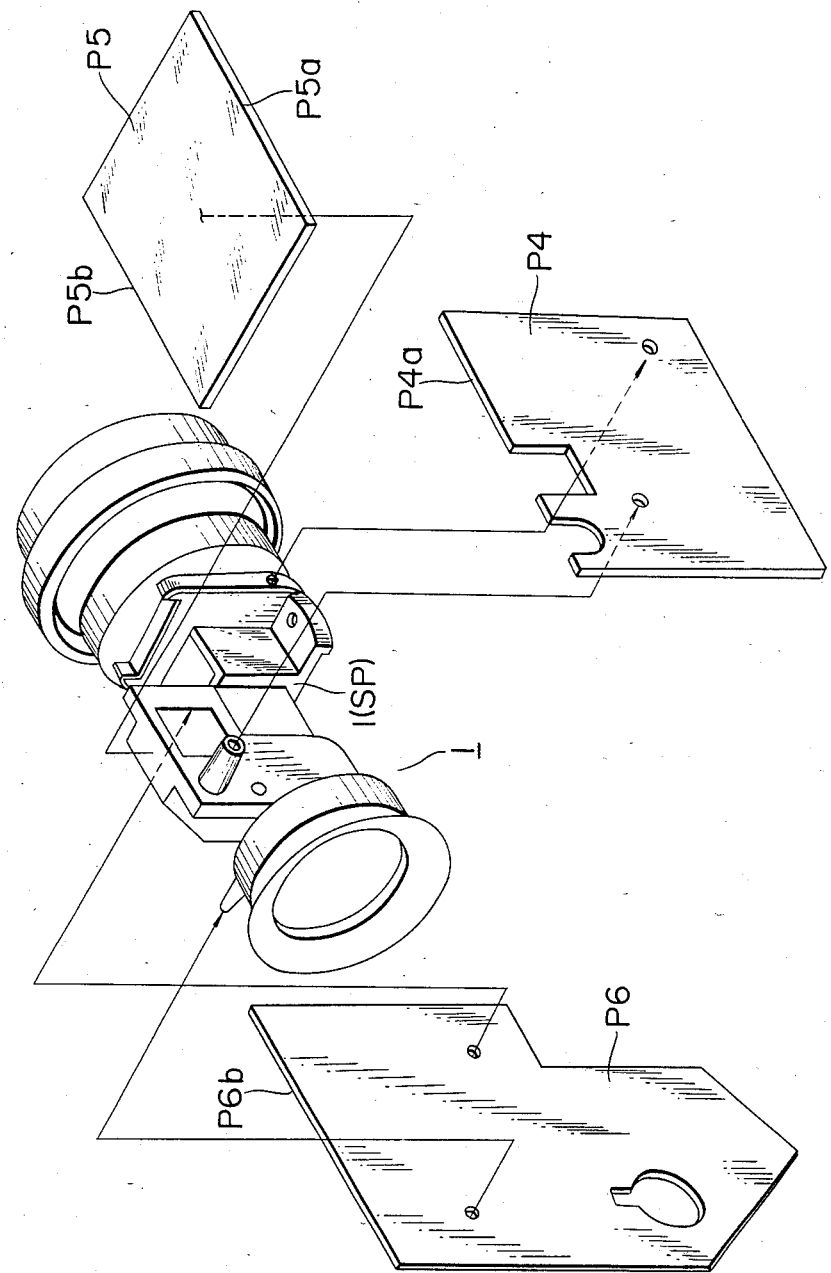

FIG. 4 illustrates how to fit the printed circuit boards respectively to the neighborhood of lens barrel member 1 of the optical system including the viewfinder system. Wherein, three pieces in total of printed circuit boards P4, P5 and P6 are provided U-shapewise to the outer circumference of the lens barrel member 1(SP) of the splitting prism SP or the half-mirror so as to cover at least three sides of the circumference of the lens barrel member. A plurality of wires may be provided between the top-edge P4a of the printed circuit board P4 provided on one side of the lens barrel member 1(SP) and the edge P5a, which faces to the same side of the barrel member, of the printed circuit board P5 which is provided to the upper side of the barrel, and a plurality of the other wires may also be provided between the top-edge P6b of the printed circuit board P6 provided on the other side of the lens barrel member 1(SP) and the edge P5b which faces to the other side of the printed circuit board P5 provided onto the upper side of the lens barrel member 1(SP), so that the spaces are effectively utilized by dividing the printed circuit boards into fractions and fit them around the lens barrel member as mentioned above.

A deflection circuit which also generates synchronizing signals may be formed on the printed circuit board P4, and a process circuit for signal processing is formed on the printed circuit board P6. Circuit parts are also provided onto the printed circuit board P6 to make the final adjustment.

Lens barrel member 1, camera tube fixture frame 1 (T) and camera tube T are incorporated in a body and thereto the described printed circuit boards P1 through P6 are attached, and they are fixed to the inside of the camera shell.

In this example three pieces of electrical circuit boards are illustrated so as to form U-shapewise structure because a camera tube which requires relatively high voltage (approximately 2-5 KV), so that this part had better be separated from other circuit board to which only a few tens volts (normally 6-12 V) are applied. When, for example, charge coupled devices (CCD), to which application of high voltage may not be necessary, are use as an electrial image-receiving means, the video camera according to the invention can be much more miniaturized by suitably arranging such electrical circuit boards so as to surround both optical system and image receiving means. In any case total volume can be reduced drastically according to the invention as compared with heretofore known and commercialized video cameras.

Figure 5:
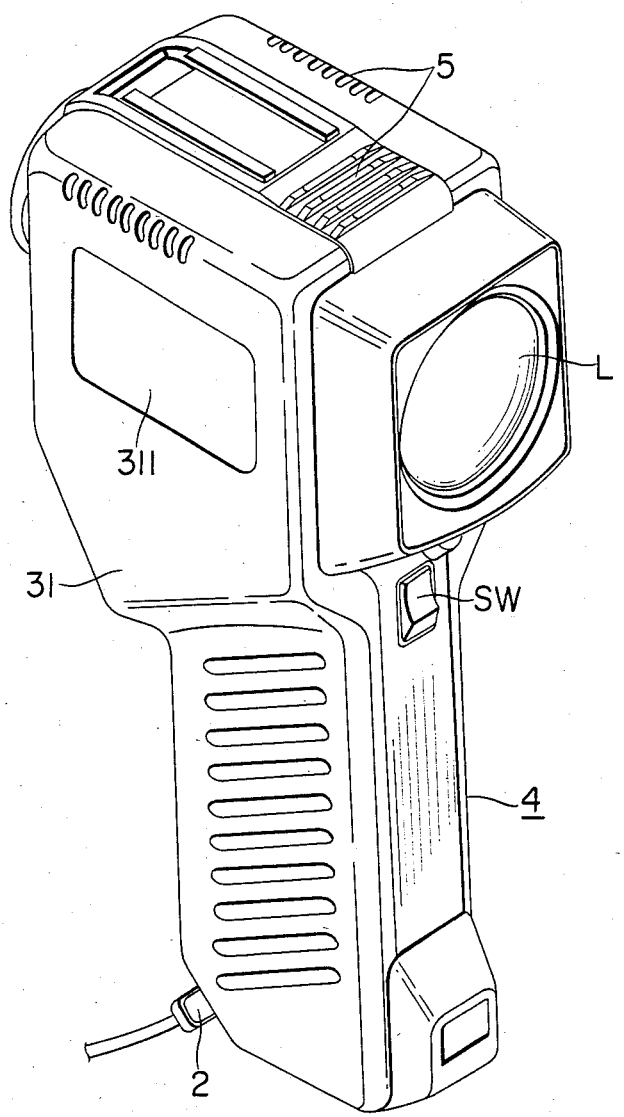
FIG. 5 shows a perspective pictorial view of the appearance of a video camera manufactured in accordance with the invention.

FIG. 5 is a perspective view illustrating the appearance of a video camera having the internal constitution described above. Wherein, release switch SW can be pushed with holding the prip 4. Adjustment window 311 is provided onto the side cover 31 of the camera. Electric adjustments are made in the manner that the window 311 is opened and then the adjustment parts on the printed circuit board P6 positioned correspondingly to the window 311 are adjusted.

Compactness is devised by dividing the printed circuit boards into fractions to effectively utilize the space. Since compactness makes the space between the shell member and the printed circuit boards narrower, and therefore, in the invention, an air ventilation holes (not shown in the drawing) may preferably be provided on the printed circuit boards and breathing holes 5 are also made on the cover parts that is a shell member so as to increase the efficiency of ventilation.

The grip 4 is provided with connector cord 2 to connect to a power source outside the camera and to a video record. There reduces greatly the inconveniences of taking pictures caused by connecting a cord to a camera body because connector cord 2 is provided to grip 4.

We claim:

1. A video camera comprising an image-forming lens system having an optical axis, and a light-beam splitting means capable of splitting an incident light-beam from said image-forming lens system into a primary optical path along said optical axis and leading into a view finder means, and a secondary optical path bent at an angle to said primary optical path and leading into an electrical image-receiving means;

said video camera characterized in that an electrical circuit means is arranged so as to cover three sides of said light-beam splitting means other than a side facing said secondary optical path.

2. The video camera according to claim 1 wherein said image-forming lens system is a zoom lens.

3. The video camera according to claim 2 comprising a focusing means.

4. The video camera according to claim 1 wherein said bent angle of said secondary optical path is substantially orthogonal.

5. The video camera according to claim 1, wherein said electrical receiving means comprises a camera tube and an electrical circuit board for the camera tube.

6. The video camera according to claim 1, wherein said electrical image-receiving means comprises a plurality of charged couped devices (C.C.D.).

7. A video camera having an optical path through a zoom lens, said path being branched into a straight path and a bent path wherein there is provided, a camera tube in the bent optical path, a viewfinder in the straight optical path, printed circuit boards arranged in a U-shape manner around said branched portion of said optical path with the open end facing the camera tube side, electrical circuit boards surrounding both said branched paths and said camera tube, and a high voltage circuit board disposed along said camera tube, whereby said camera tube and said high voltage circuit board are adapted to be built into a grip.

8. A video camera according to claim 7 wherein said bent path is substantially orthogonal.

9. The video camera of claim 7, wherein the cover of said camera is provided with breathing holes having heat radiation effects.

10. The video camera of claim 7, wherein a release switch is provided to said grip.

11. The video camera of claim 7, wherein a connector cord is provided to said grip.

* * * * *